J. W. BROWN.
MEAT CLAMP OR SKEWER.
APPLICATION FILED MAR. 9, 1914.

1,113,929.

Patented Oct. 13, 1914.

WITNESSES
C. K. Davies
H. A. Phillips

INVENTOR
JOHN W. BROWN
By Thomas R. Harvey
Attorney.

UNITED STATES PATENT OFFICE.

JOHN W. BROWN, OF THE UNITED STATES SOLDIERS' HOME, DISTRICT OF COLUMBIA.

MEAT CLAMP OR SKEWER.

1,113,929.

Specification of Letters Patent.

Patented Oct. 13, 1914.

Application filed March 9, 1914. Serial No. 823,453.

*To all whom it may concern:*

Be it known that I, JOHN W. BROWN, a citizen of the United States of America, residing at United States Soldiers' Home, in the District of Columbia, have invented certain new and useful Improvements in Meat Clamps or Skewers, of which the following is a specification.

My present invention relates to improvements in meat clamps or skewers and is designed especially to provide a device by means of which meats may be clamped or secured together in a desirable and efficient manner.

The primary object of the invention is the provision of a skewer for holding or retaining "roasts," etc., together when being baked in an oven or boiled in a receptacle.

In actual practice it has been found that there are numerous objections to the present modes of holding the meats together while being prepared for a meal, as for instance a cord is often wrapped about the meat and in many cases the cord either breaks or is burned asunder, wooden skewers made of simple straight sticks burn in a hot oven, and when the meat has a tendency to swell in boiling the straight skewers, both iron and wood, become ineffective to prevent this, and as a consequence much of the nutrition is lost for the reason that the wrapped piece of meat separates and the nutrition escapes therefrom. By the utilization of my device the piece of meat is held securely between two retaining members and when so clamped spreading or loosening of the meat is impossible.

In the accompanying drawings I have illustrated one complete example of the physical embodiment of my skewer constructed according to the best mode I have so far devised for the practical application of the principles of my invention.

Figure 1:
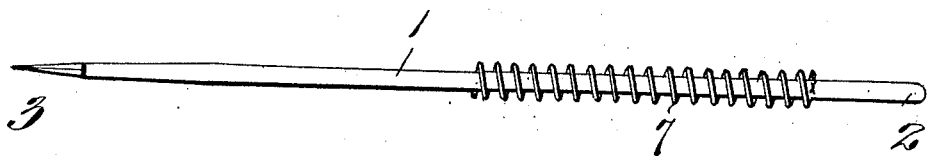
Figure 2:
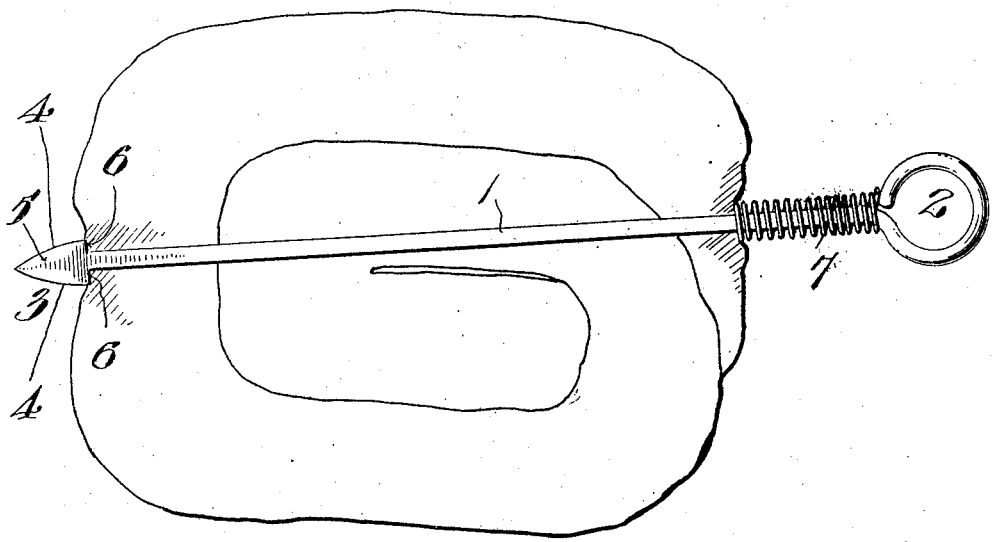
Figure 3:
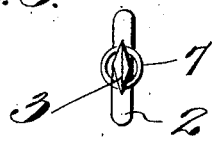

Figure 1 shows a side view of a clamp or skewer embodying the novel features of my invention. Fig. 2 shows the skewer turned at right angles to Fig. 1 and embedded in a piece of meat to retain the wrapped or rolled construction of the meat. Fig. 3 is a view looking at the pointed end of the skewer.

In the preferred embodiment of my invention I utilize a metallic shank 1 preferably of steel and fashioned with a ring or loop 2 to provide a convenient handle for manipulating the skewer. At its opposite end the shank is formed with a spear head, indicated as a whole by the numeral 3, and the curved edges 4 of the head are sharpened to a knife edge and extend to the point of the spear head. The flat faces of the spear head are indicated by the numerals 5, and it will be noted that these flat faces lie in a horizontal plane with the ring or handle 2 at the opposite end of the shank. The flat faces 5 are smooth and are wedge shape toward the point of the head 3, but at the rear the head is formed with a pair of abruptly arranged shoulders 6, 6, extending at approximately a right angle from the longitudinal axis of the shank. These shoulders are retaining shoulders which coact with a coiled spring 7 loosely supported on the shank 1 and between these members the meat is held secure.

The application of the invention to practical use is illustrated in Fig. 2 where the skewer is shown in place. In using the skewer, the meat is first wrapped or rolled into proper form, then the skewer which is grasped between the thumb and first finger with the ring handle and flat spear-head held in horizontal position, is entered and pushed from one side of the piece of meat, through, and out at the opposite side and immediately following this movement the skewer is given a quarter turn to bring the head and handle into vertical position as shown in Fig. 2.

It will be understood that the curved edges 4, 4, are sufficiently sharpened to permit the passage of the skewer through the meat with comparatively little effort, and the wedge shape of the head also enables the head to make a clean cut without marring the meat.

It will be observed that the spring 7 is compressed between the meat and the handle or ring, and in this manner the skewer is adjustable to various sizes of pieces of meat, but in all cases the spring is of sufficient tension to co-act with the shoulders 6, 6, and hold the meat tightly and securely therebetween, and in this manner prevent the meat from spreading, or unrolling.

While I have referred only to a "roast" herein, it will of course be understood that the skewer is capable of use on all kinds and shapes of meats to which it is applicable, and while I have illustrated only one size skewer, it will be apparent that larger and even smaller skewers may be used, and I contemplate furnishing the skewers in various sizes.

I do not limit myself to the exact details of construction illustrated, as it is manifest I may change the form and shape of the spear-head and the coiled spring or compressible retaining member may also be altered if desired without departing from the spirit of my invention.

From the above description taken in connection with the drawings it is evident that I have produced a skewer or meat clamp that will prove a highly desirable article for use in households, cafés, restaurants, etc., and other places where meat is prepared by boiling, baking, or otherwise for meals.

What I claim is:—

A meat clamp comprising a straight shank formed with a flat pointed head having sharpened edges and angular stop shoulders at the inner end of the head, an enlarged handle, and a compressible tension spring coiled about the shank contiguous to the handle.

In testimony whereof I affix my signature in presence of two witnesses.

JOHN W. BROWN.

Witnesses:
M. L. NEWCOMB.
CHAS. K. DAVIES.